No. 724,162. PATENTED MAR. 31, 1903.
W. S. & C. I. CORBY.
MACHINE FOR MAKING AND MIXING DOUGH.
APPLICATION FILED JULY 14, 1900.
NO MODEL. 2 SHEETS—SHEET 1.
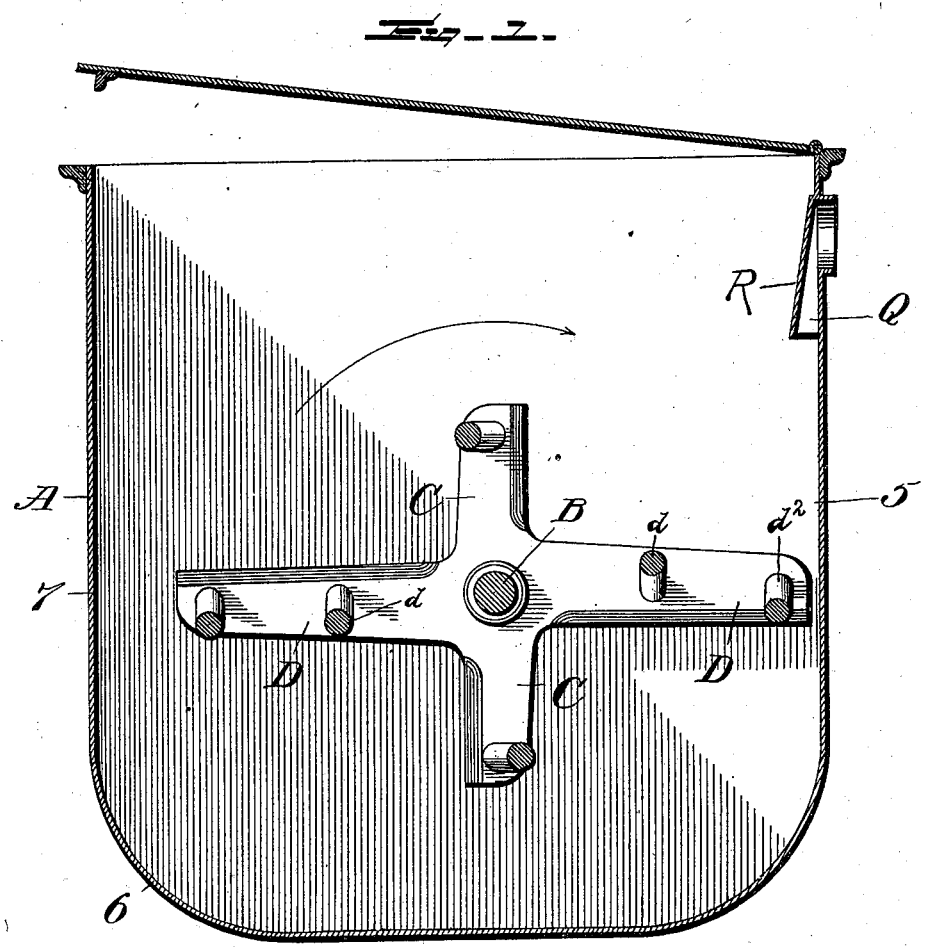
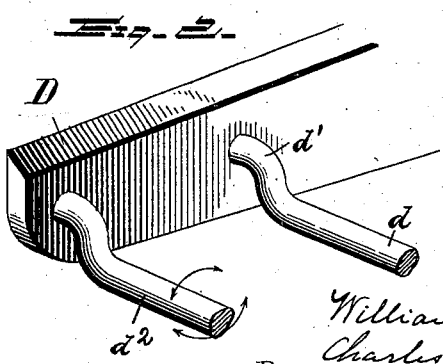
WITNESSES:
L. C. Hills.
Geo. B. May, Jr.
INVENTOR
William S. Corby and
Charles I. Corby
BY
J. T. Barker
Attorney No. 724,162. PATENTED MAR. 31, 1903.
W. S. & C. I. CORBY.
MACHINE FOR MAKING AND MIXING DOUGH.
APPLICATION FILED JULY 14, 1900.
NO MODEL. 2 SHEETS—SHEET 2.
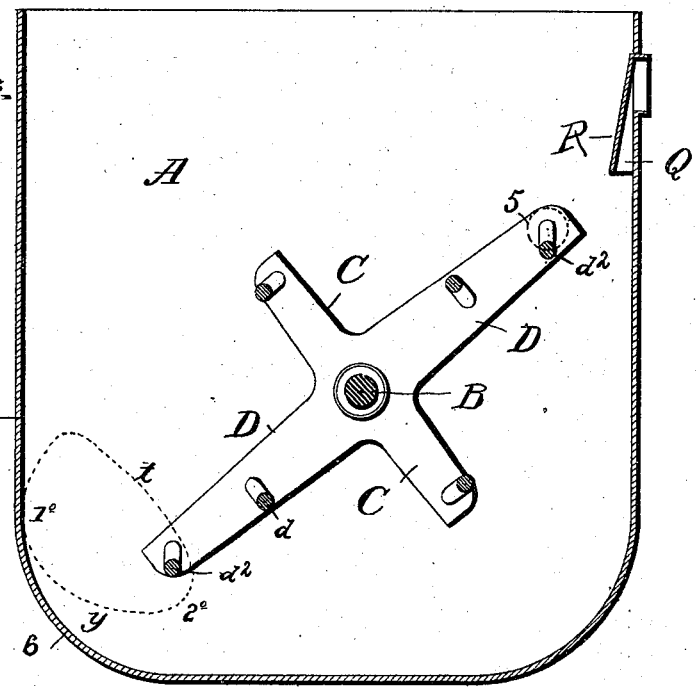
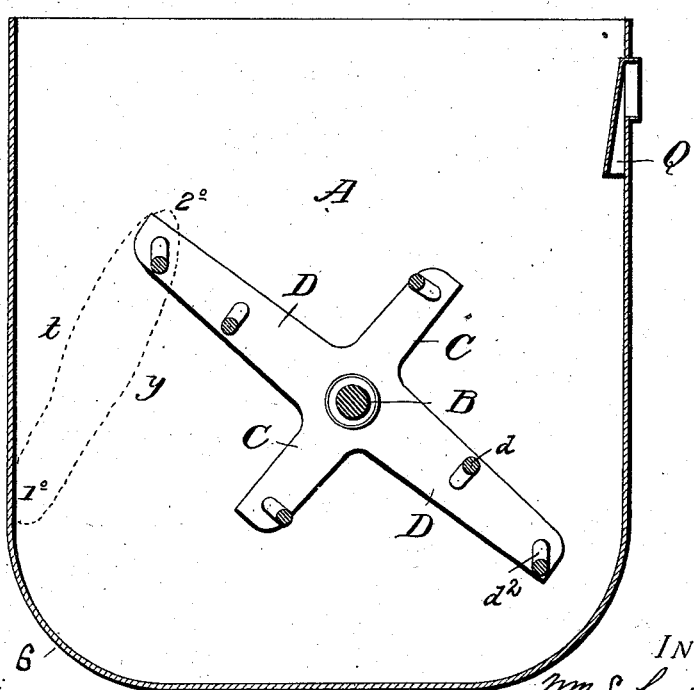
WITNESSES:
L. C. Hills
Geo. T. May, Jr.
INVENTORS
Wm. S. Corby and
Charles I. Corby
BY J. S. Barker
Attorney

UNITED STATES PATENT OFFICE.

WILLIAM S. CORBY AND CHARLES I. CORBY, OF WASHINGTON, DISTRICT OF COLUMBIA, ASSIGNORS TO WARD-CORBY COMPANY, OF PITTSBURG, PENNSYLVANIA, A CORPORATION OF NEW JERSEY.

MACHINE FOR MAKING AND MIXING DOUGH.

SPECIFICATION forming part of Letters Patent No. 724,162, dated March 31, 1903.

Application filed July 14, 1900. Serial No. 23,602. (No model.)

*To all whom it may concern:*

Be it known that we, WILLIAM S. CORBY and CHARLES I. CORBY, citizens of the United States, residing at Washington, in the District of Columbia, have invented a new and useful Improvement in Machines for Making and Mixing Dough, of which the following is a specification.

Our invention relates to machines for making dough, and particularly to machines of the type illustrated in our Patent No. 640,096, dated December 26, 1899. It has for its object to produce a machine of this kind which shall run steadily, shall operate to quickly and perfectly shred or draw out the dough, and which will work with less power and will not heat the dough during the mixing operation to the same extent as do other machines of which we have knowledge. In order to secure these results, we have improved the form of the beater and also of the tank or vessel in which the beater operates.

In the accompanying drawings, Figure 1 is a vertical cross-sectional view of a machine constructed according to our invention. Fig. 2 is a perspective view of a part of the beater, illustrating the swinging beater-bars. Figs. 3 and 4 are vertical cross-sectional views of the apparatus, showing the beater in different positions and diagrammatically illustrating its action upon a mass of dough.

In the drawings accompanying this case we have not illustrated the driving mechanism, as that may be similar to that shown in our aforesaid patent or of any other suitable construction.

The beater consists of a central shaft B, a pair of spiders at the opposite ends of the shaft, and a series of longitudinal connecting-bars $d$.

In operating according to our process of making dough it is very important that the beater should be balanced—that is to say, the parts upon opposite sides of the shaft should be of substantially similar size and construction in order that the beater shall run steadily, as otherwise the mixing-machine and the motor are violently strained. We have found that the best results are attained in operating with a beater having four sets of longitudinal bars $d$, carried by four spider-arms, arranged radially. In our aforesaid patent the arms of the spider were of equal length and each supported an equal number of longitudinal beater-bars. We have discovered that better results are obtained if two of the spider-arms C are considerably shorter than the intermediate spider-arms D and carry a less number of longitudinal bars $d$, as clearly illustrated in Fig. 1. The reason for this is that in a machine in which it is necessary to run the beater at the speed required to properly carry out our process of dough mixing the dough does not fly away from or leave the beater-bars with sufficient freedom if arranged too close together, and therefore a beater having but two sets of oppositely-arranged and balanced shredding beater-bars is the most effective form of beater which we have been able to devise. So far as the shredding of the dough is concerned the shorter spider-arms C and the longitudinal beater-bars which they carry might be omitted, but the dough would then tend to collect more or less about the shaft B, and hence we employ the shorter spider-arms C and the longitudinal bars, which they carry, more for the purpose of keeping the dough away from the center of the beater than for shredding and mixing the dough, though they perform the latter function to a limited degree. It will be seen that the spiders situated at the ends of the shaft B and by which the beater-bars are supported and carried operate to hold the two sets of oppositely-disposed beater-bars in fixed relations to each other—that is to say, the set of beater-bars carried by the shorter arms C of the spiders are always intermediate the set of beater-bars carried by the longer arms D. In this respect our invention differs from those forms of mixing-machines in which it has been proposed to arrange one set of beater-bars upon one set of supporting-arms and another set of beater-bars upon a different set of supporting-arms and to drive the two sets of supporting-arms and beater-bars independently. It is obvious that the purposes and advantages of our invention, which have just been referred to, can only be attained when the bars are arranged as described and are rigidly connected—that is, so connected that the sets of beater-bars have fixed relations with reference to each other.

We have discovered from repeated tests and practical operations that a beater constructed as described will run with great steadiness, that it will mix a dough more rapidly than a beater constructed as shown in our aforesaid patent, and therefore it operates more effectively to shred the dough, and that it will not heat the dough to the same extent as when a beater such as shown in our patent is used. Such a beater effects a practical saving of several minutes' time in each batch of the dough mixed and results in a substantial saving of ice in the cooler for the fan or blowing apparatus usually employed with our machine.

The beater-bars are preferably bent near their outer ends, as represented at $d'$, Fig. 2, so that the bars are eccentric to their axis of attachment to the spider-arms for a purpose set forth in our Patent No. 639,889, dated December 26, 1899. We have discovered that when the beater-bars are thus shaped the best results are obtained when the outer beater-bars $d^2$ are loosely mounted in the spider-arms, as indicated by the dotted circle 5, Fig. 3, which circle marks the path which may be described by the central axis of the longitudinal portion of the beater-bar $d^2$. In a beater run at the speed required to carry out our process sufficient centrifugal force is generated to throw the dough masses and particles away from the beater and against the walls of the tank or vessel A, in which the beater operates, these particles being again caught and carried forward by the beater-bars, and from this action it follows that the outermost longitudinal beater-bars $d^2$ perform the greater part of the effective work of mixing the dough. By loosely mounting these outer bars, as just described, the machine is caused to run somewhat more steadily and easily than when they are rigidly supported. The reason for this, we are led to believe, is that should a bar $d^2$ meet in its travel a mass of dough of unusual solidity or which from other reasons offers unusual resistance to the bar, the latter may yield somewhat in passing through or in moving such resisting dough mass. This is particularly important during the early stages of mixing a dough when the dough ingredients are not uniformly commingled and have not attained a smooth and homogeneous consistency.

Our experience and practical operation of the beater of the form just described have led us to the belief that this beater is an improvement over our earlier styles of beater for all kinds of doughs. We have also discovered that in mixing certain kinds of dough a different shape or construction of the tank or vessel A from any of the forms shown in our aforesaid patent, No. 640,096, produces improved or advantageous results, and we have in the accompanying drawings illustrated a new form of tank or vessel which we have invented. In describing the tank we shall refer to that side through which is the opening Q for the air-blast as the "rear" side, and the opposite side as the "front." In our apparatus the beater always moves in the direction indicated by the arrow—that is to say, the beater-arms on the rear side of the axis take the general course or direction of the air-blast, which is directed downward along the rear side of the tank or vessel by the deflecting-plate R.

It is desirable that the shredding of the dough in the immediate presence of the air-blast should be as effective and thorough as possible, and for that reason we have arranged the rear wall of the tank or vessel A so that it comes close to the path of the outermost beater-bar in the horizontal plane of the shaft B. When thus arranged the particles of dough which are thrown off from the beater by centrifugal force against the rear wall are caught by the latter much nearer the opening Q than when the rear wall is flared, as shown in our first-mentioned patent, and accordingly the shredding action begins higher up and nearer to the air-opening and is continued for a greater distance in the immediate presence of the air-blast.

In our patent just mentioned we described and illustrated a form of tank or vessel A having at its lower front corner a bulge or pocket, above which bulge or pocket the front wall of the tank or vessel approached close to the path of the outer beater-bars. In our present improvement we shape the lower front portion 6 of the mixing-tank or vessel so that it is more eccentric to the path of the beater than is the lower rear portion of the vessel, by such construction retaining the advantages incident to the bulge or pocket of our earlier mixing-machine as set forth in the aforesaid patent, and we so dispose the front wall 7 that there is considerable free space above the eccentric portion 6 of the vessel and between such wall and the path of the outermost beater-bars along the line where the horizontal plane passing through the axis of the shaft B cuts such front wall, the beater-bars running much nearer to the rear wall than they do to this front wall 7. The reason for making this latter change in construction is to improve the shredding of the dough and its thorough aeration. The particles of dough which are thrown off and collect in the eccentric portion 6 of the mixing vessel are not only drawn out sheeted or shredded as they are picked up by the succeeding beater-bars, but they are also turned over. To illustrate this we will suppose that a mass of dough more or less sheeted and folded upon itself and around the beater-bars is being carried by such bars until finally the centrifugal force exerted upon the mass of dough overcomes its tenacity and tendency to cling to the beater-bars and it flies off and lodges in the eccentric portion 6 of the mixing vessel, Fig. 3. While being carried by the beater-bars the particles of this mass had a certain relation to each other, certain portions being in advance of others. When, however, the mass of dough leaves the beater-bars and is thrown off into the eccentric portion 6 it turns so that the portion 1° thereof, which portion was the forward portion or part of the mass while it was being carried about by the beater, is toward the wall of the tank. When this mass of dough is picked up and drawn out or sheeted by succeeding beater-bars, there is a tendency to turn over or reverse the arrangement of its particles 1°—that is to say, those particles which before were in advance—say, in front of the beater-bars—become the rear particles of the new mass, being situated, we will say, behind the set of beater-bars which now carries them. This operation of turning over the dough as it leaves the beater and lodges in the portion 6 of the tank or vessel and is again picked up by the beater does not take place with mathematical precision and accuracy, as above stated, because the particles which form one mass of dough surrounding a set of beater-bars are never all brought together again into one mass upon the beater-bars; but the general operation is to turn the dough over, as has been described, and this operation we find advantageous. By making the eccentric portion 6 on the front side and arranging the wall 7 at a considerable distance away from the path of the upward-moving beaters the dough in such eccentric portion of the vessel when once caught by a beater-bar and drawn out and sheeted tends to fall down behind the beater-bar under the influence of gravity and into the path of the beater bar or bars next following, so that it is surely and certainly caught thereby, and thus the action of gravity assists in the turning over of the dough and renders the shredding more easy, rapid, and perfect. This operation of turning the dough mass as it is being drawn out from the portion 6 of the tank or vessel is represented diagrammatically in Figs. 3 and 4, where 1° designates the portion of the mass that was in advance before the mass was thrown off the beater and which becomes the rear portion of the mass after it is again picked up and turned over by the beater, while 2° represents the opposite portion of the said mass. The reference-letters $t$ and $y$ are applied to opposite sides of the mass and tend to assist in indicating the fact that the mass is reversed in position by the act of being drawn out from the eccentric portion 6 of the vessel.

Having described our invention, what we claim, and desire to secure by Letters Patent, is—

1. In a dough-mixing machine, a beater having longitudinal beating-bars, arranged eccentrically to their axis of support and loosely mounted whereby they are free to swing, substantially as set forth.

2. In a dough-mixing machine, a beater having the supporting spider-arms, and beater-bars mounted loosely therein, the bars being bent at $d'$, substantially as set forth.

3. In a dough-mixing machine, a beater comprising longitudinal beater-bars arranged in sets that are oppositely disposed and are arranged to travel relatively close to the walls of the tank or vessel in which the beater is mounted, and other sets of oppositely-disposed longitudinal beater-bars arranged between the first-mentioned beater-bars and disposed closer to the axis of rotation of the beater than are the bars of the first-named sets, the two sets of bars being rigidly connected, whereby their relations to each other are always the same, substantially as set forth.

4. In a dough-mixing machine, a beater comprising separate spiders each having oppositely-arranged long arms D, D, and oppositely-arranged short arms C, C, disposed substantially midway between the arms D, D, and longitudinal beater-bars carried by the said sets of arms, substantially as set forth.

5. In a machine for mixing dough, the combination of a tank or vessel and a revolving beater mounted therein and arranged to revolve so that its beater-bars move upward past the front wall of the vessel and downward past the rear wall thereof, the tank or vessel being constructed with its rear wall relatively close to the path followed by the beater-bars, with an eccentrically-disposed portion 6 at its lower front portion, and with its front wall 7 above the eccentric portion 6 disposed at a considerable distance from the path of the outermost beater-bars, such distance being greater than the distance of the rear wall from the path of such bars, whereby the dough is shredded and sheeted by the downward movement of the beater, and thrown-off masses of the dough are allowed to collect in the eccentric portion 6 and be turned over or reversed in position as they are lifted by the beater from the said eccentric portion of the vessel past the front wall 7, substantially as and for the purposes set forth.

WILLIAM S. CORBY.
CHARLES I. CORBY.

Witnesses:
ALBERT A. WHITE,
JAMES B. DOBSON.